(12) United States Patent
Yurjevich et al.

(10) Patent No.: US 8,347,703 B2
(45) Date of Patent: Jan. 8, 2013

(54) TIRE CHIP AND TEAR TEST APPARATUS AND METHOD

(75) Inventors: Martin A. Yurjevich, North Canton, OH (US); David O. Stalnaker, Hartville, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 13/025,240

(22) Filed: Feb. 11, 2011

(65) Prior Publication Data

US 2012/0204633 A1 Aug. 16, 2012

(51) Int. Cl.
*G01M 17/02* (2006.01)

(52) U.S. Cl. ......................................... 73/146

(58) Field of Classification Search .................. None
See application file for complete search history.

(56) References Cited

U.S. PATENT DOCUMENTS

| | | | |
|---|---|---|---|
| 3,130,957 A | 4/1964 | Branick | |
| 3,563,088 A | 2/1971 | Sperberg | |
| 3,599,486 A | 8/1971 | Pernau | |
| 3,914,907 A * | 10/1975 | Hofelt et al. | 451/28 |
| 4,160,378 A | 7/1979 | Himmler | |
| 4,475,383 A * | 10/1984 | Fischer et al. | 73/146 |
| 5,027,649 A * | 7/1991 | Himmler | 73/146 |
| 5,040,413 A | 8/1991 | Ohms | |
| 5,437,321 A * | 8/1995 | Breny | 152/454 |
| 5,635,016 A * | 6/1997 | Byerley | 156/406.2 |
| 5,703,284 A * | 12/1997 | Gerhards et al. | 73/146 |
| 6,116,084 A * | 9/2000 | Fischer et al. | 73/146 |
| 6,532,811 B2 | 3/2003 | Turner | |
| 6,804,998 B2 | 10/2004 | Turner | |
| 7,007,548 B2 | 3/2006 | Jahn | |
| 7,140,242 B1 | 11/2006 | Poling, Sr. | |
| 7,168,307 B2 | 1/2007 | Jahn | |
| 7,222,522 B2 | 5/2007 | Monguzzi | |
| 7,249,497 B2 | 7/2007 | Samples | |

(Continued)

FOREIGN PATENT DOCUMENTS

| | | |
|---|---|---|
| JP | H06-129954 | 5/1994 |
| JP | 2004-198219 | 7/2004 |
| JP | 2007-298442 | 11/2007 |

OTHER PUBLICATIONS

Kim, Myoung Chan, International Search Report and Written Opinion, Sep. 24, 2012, pp. 1-11, Korean Intellectual Property Office.

*Primary Examiner* — Andre Allen

(57) ABSTRACT

A tire testing apparatus that includes a test drum and at least one tire station. The test drum has an outer radial surface and a plurality of sectioned plates having outer radial test surfaces, wherein the plurality of sectioned plates mount on the outer radial surface of the test drum. The tire testing apparatus further includes at least one tire station having a selected tire with a tread, wherein the tread of the selected tire presses against the outer radial test surface of the plurality of sectional plates, and wherein the at least one tire station applies a force against the tread of the selected tire. Further, a tire testing method includes providing a selected tire having a circumferential tread and moving the selected tire against a rotating test drum having a plurality of sectional plates having a test surface. Further, the method includes maintaining contact between the selected tire and the plurality of sectional plates for a selected period of time, moving the selected tire away from the test drum, and evaluating the tread for wear.

20 Claims, 13 Drawing Sheets

U.S. PATENT DOCUMENTS

| | | |
|---|---|---|
| 7,624,629 B2 | 12/2009 | Hanada |
| 2001/0022802 A1* | 9/2001 | Kurata ............................ 374/45 |
| 2002/0104366 A1* | 8/2002 | Sinnett ........................... 73/1.01 |
| 2009/0120178 A1 | 5/2009 | Iwase |
| 2009/0278399 A1* | 11/2009 | Srivats et al. ............ 301/95.101 |
| 2009/0308156 A1 | 12/2009 | Sumimoto et al. |
| 2010/0031740 A1* | 2/2010 | Olex et al. ....................... 73/146 |
| 2011/0011170 A1 | 1/2011 | Stalnaker et al. |

\* cited by examiner

TIRE CHIP AND TEAR TEST APPARATUS AND METHOD

FIELD OF INVENTION

The present application is directed to a tire testing apparatus and method. More particularly, the present application is directed to a tire testing apparatus and method that tests tire treads for chips and tears.

BACKGROUND

Tires have been tested on outdoor test tracks having at least one of a plurality of surfaces, including concrete, asphalt, and gravel. Outdoor test tracks require regular maintenance to provide repeatable and reliable test conditions. In addition, outdoor test tracks are subject to varying weather conditions and seasons.

SUMMARY

A tire testing apparatus that includes a test drum and at least one tire station. The test drum has an outer radial surface and a plurality of sectioned plates having outer radial test surfaces, wherein the plurality of sectioned plates mount on the outer radial surface of the test drum. The tire testing apparatus further includes at least one tire station having a selected tire with a tread, wherein the tread of the selected tire presses against the outer radial test surface of the plurality of sectional plates, and wherein the at least one tire station applies a force against the tread of the selected tire.

Further, a tire testing method includes providing a selected tire having a circumferential tread and moving the selected tire against a rotating test drum having a plurality of sectional plates, each having a test surface. Further, the method includes maintaining contact between the selected tire and the plurality of sectional plates for a selected period of time, moving the selected tire away from the test drum, and evaluating the tread for wear.

BRIEF DESCRIPTION OF THE DRAWINGS

In the accompanying drawings, embodiments of a tire chip and tear test apparatus and method are illustrated that, together with the detailed description provided below, describe various embodiments of the apparatus and method. One of ordinary skill in the art will appreciate that a single component may be designed as multiple components or that multiple components may be designed as a single component; or a single step may be designed as multiple steps or that multiple steps may be designed as a single step.

Further, in the accompanying drawings and description that follow, like parts are indicated throughout the drawings and written description with the same reference numerals, respectively. Some of the figures may not be drawn to scale and the proportions of certain parts may have been exaggerated for convenience of illustration.

FIG. 1A illustrates a close up of a section of FIG. 1 where a test drum contacts a tire;

DETAILED DESCRIPTION

The following definitions are provided to aid in the understanding of the invention. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the annular tread.

"Equatorial plane" refers to the plane that is perpendicular to the tire's axis of rotation and passes through the center of the tire's tread.

"Inclination angle" refers to an angle between a vertical axis of the wheel and the axis of the equatorial plane of the wheel when viewed from the front or rear.

"Lateral" refers to a direction along the tread of the tire going from one sidewall to the other sidewall.

"Radial" and "radially" refer to a direction perpendicular to the axis of rotation of the tire.

"Slip angle" refers to an angle between the direction a tire is pointed and the direction the tire is moving.

"Tread" refers to that portion of the tire that comes into contact with the road under normal inflation and load.

In one embodiment, a tire chip and tear test apparatus is an apparatus comprising a test drum and a tire station used to simulate road conditions. The drum includes a test surface defined by a texture of sufficient roughness to provide sufficient stress on a tire tread surface to induce chipping, tearing, or chipping and tearing of the tire tread compound. In one example, the drum rotates at a specified number of revolutions per minute to simulate a desired road speed in miles per hour. Then a selected tire rotates against the test surface, and the test tire is inspected at specified intervals to evaluate tire chips and tears and overall tread pattern volumetric loss.

Figure 1:
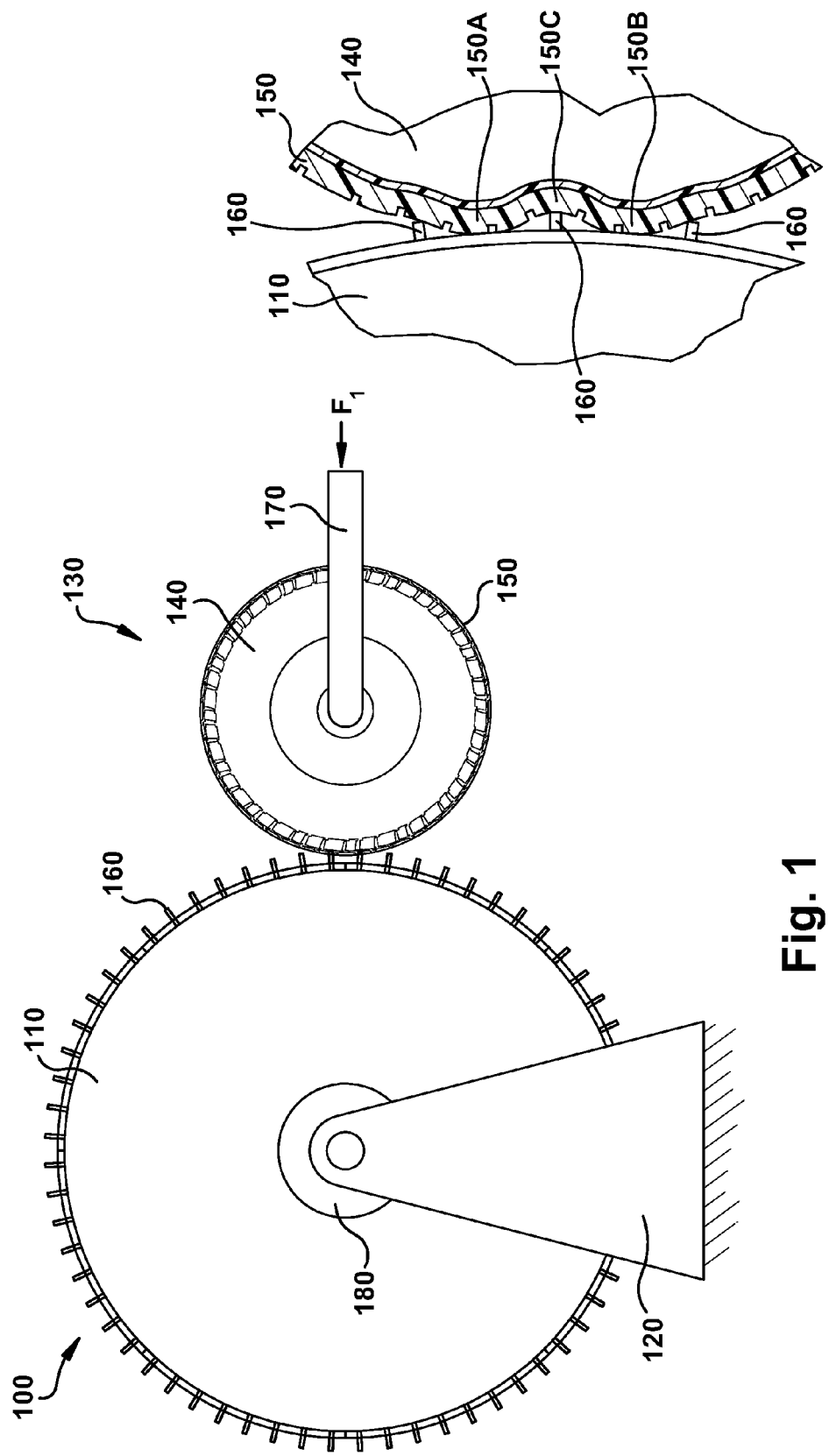
FIG. 1 illustrates a side view of a tire chip and tear test apparatus.

FIG. 1 illustrates a side view of a tire chip and tear test apparatus 100, including a rotatable test drum 110, a support 120 that holds test drum 110, and a tire station 130. The tire station 130 holds a tire 140 having a circumferential tread 150.

The rotatable test drum 110 could be of any diameter or width. Exemplary embodiments include drums having a diameter of between 33 inches (80 centimeters) and 144 inches (370 centimeters) and a lateral width (not shown) of between 3 inches (7 centimeters) and 40 inches (102 centimeters).

In the illustrated embodiment, a plurality of sectional plates 160 are removably attached and circumferentially continuous about a circumferential surface (not shown) of the rotatable test drum 110. The plurality of sectional plates forming a test surface having protrusions that extend therefrom. The protrusions may have varying heights, widths, and levels of sharpness.

In another embodiment (not shown), sectional plates 160 are fixedly attached to rotatable test drum 110 by a known attachment means, such as welding. In yet another embodiment (not shown), sectional plates 160 are an integral part of rotatable test drum 110. In still another embodiment (not shown), sectional plates 160 are not circumferentially continuous, but rather are attached to a portion of the radial surface of rotatable test drum 110.

In yet another embodiment (not shown), the rotatable test drum does not include sectional plates, but instead the outer radial surface of the test drum is a test surface. Accordingly, it should be understood that where sectional plates are discussed below, such description may also apply to a section of a test drum not having sectional plates, but instead having a circumferentially continuous outer radial test surface.

Tire station 130 applies a force $F_1$ against tread 150 by moving tire 140 into a position where the sectional plates 160 on the rotating test drum 110 contact at least a portion of tread 150. Tire station 130 includes an arm 170 that holds selected tire 140 to simulate a tire mounted on a vehicle, at a selected slip angle and inclination angle with respect to the surface of test drum 110. For example, arm 170 holds selected tire 140 at a slip angle from −15 degrees to +15 degrees. Further, arm 170 holds selected tire 140 at an inclination angle from −15 degrees to +15 degrees. Further, tire station 130 can move selected tire 140 and tread 150 laterally. For example, tire station 130 may move selected tire 140 laterally in a wavelike pattern to induce uniform wear on tread 150.

Friction between tread 150 of selected tire 140 and the plurality of sectional plates 160 simulate road forces produced by various road conditions. In the illustrated embodiment, force $F_1$ is a radial force. A radial force is a force in a direction perpendicular to the circumferential direction of the tread. In another embodiment (not shown), force $F_1$ is a fore force. A fore force is a force toward the direction of travel. In yet another embodiment (not shown), force $F_1$ is an aft force. An aft force is a force toward a direction opposite of travel. In another embodiment (not shown), arm 170 can apply a force $F_1$ that includes at least one of the following: a fore force, an aft force, a lateral force, and a radial force.

A motor 180 rotates test drum 110 at a target speed. In another embodiment (not shown), a motor 180 rotates selected tire 140. In yet another embodiment (not shown), a first motor rotates test drum 110 at a first target speed and a second motor rotates selected tire 140 at a second target speed. In another embodiment (not shown), motor 180 includes a load cell to measure the force applied to the tire.

In another embodiment (not shown), a motor (not shown) extends and retracts tire station 130, including arm 170 and selected tire 140, to and from test drum 110. In yet another embodiment (not shown), a hydraulic system (not shown) extends and retracts tire station 130, including arm 170 and selected tire 140, to and from test drum 110. In another embodiment (not shown), a pneumatic system (not shown) extends and retracts tire station 130, including arm 170 and selected tire 140, to and from test drum 110.

FIG. 1A illustrates a close up side view of a section of FIG. 1 where a test drum 110 having a sectional plate 160 contacts the circumferential tread 150 of tire 140. Circumferential tread 150 changes circumferential shape as tire 140 rotates into the section plates 160. For example, in the illustrated embodiment, a first circumferential tread portion 150A and a second circumferential tread portion 150B maintain a circular circumferential shape as the tread portion contacts a smooth portion of sectional plate 160, and third circumferential tread portion 150C forms a concave circumferential shape as the tread portion is pushed radially inward by test surface of sectional plate 160 that has protrusions of varying heights, widths, and levels of sharpness.

Figure 2:
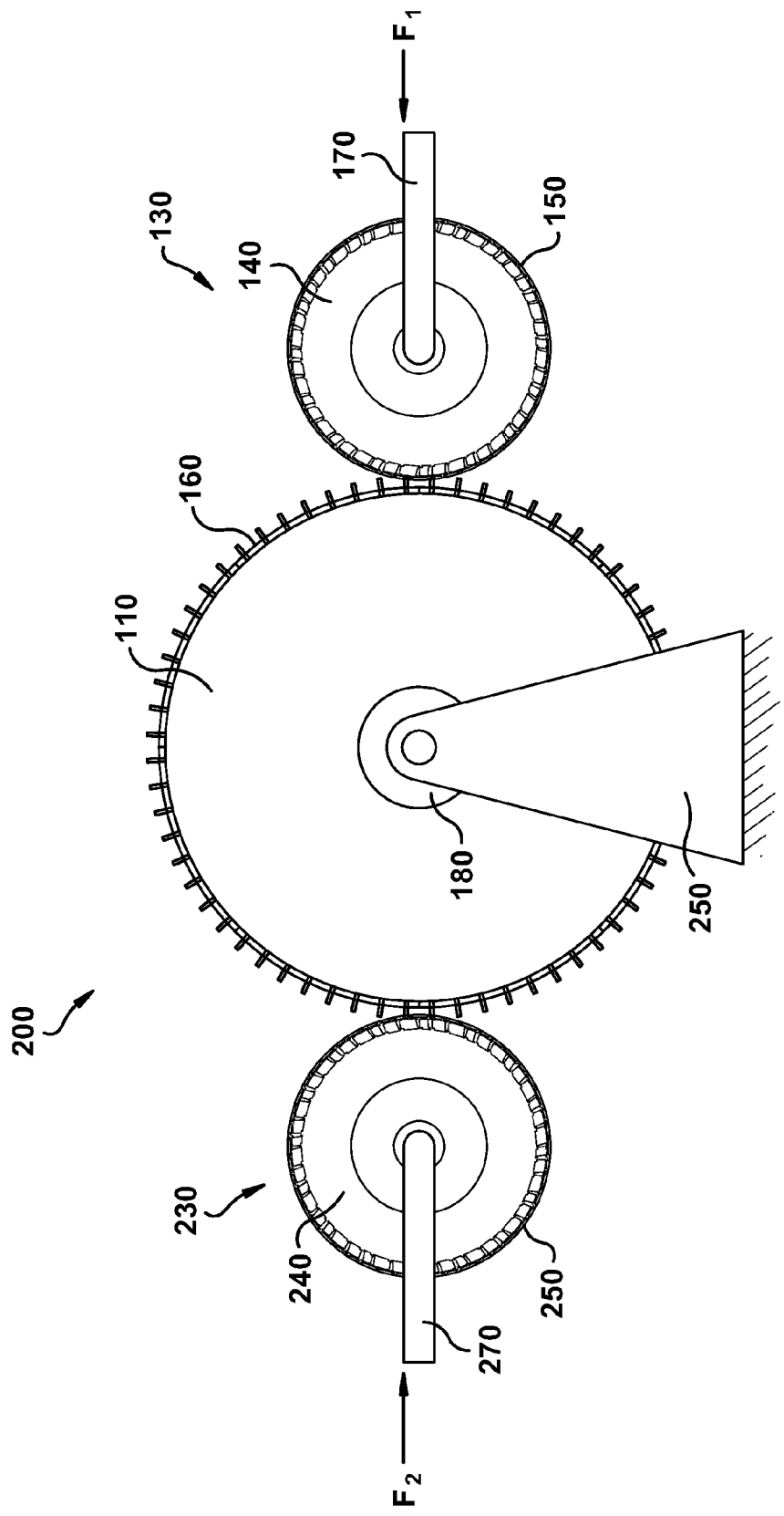
FIG. 2 illustrates a side view of an alternative embodiment of a tire chip and tear test apparatus.

FIG. 2 illustrates a side view of another embodiment of a tire chip and tear test apparatus 200 including a test drum 110, a support 120, and two tire stations. The apparatus 200 is substantially the same as the apparatus 100 illustrated in FIG. 1, except that the apparatus 200 further includes a second tire station 230 and a second selected tire 240. Second tire station 230 has a second arm 270 that forces second selected tire 240 against test drum 110 by applying a second forces $F_2$.

In the illustrated embodiment, selected tires 140, 240 have the same dimensions. In another embodiment (not shown), selected tires 140, 240 do not have the same dimensions.

In the illustrated embodiment, treads 150, 250 are substantially similar. In another embodiment (not shown), treads 150, 250 are not substantially similar, e.g., the treads have different designs or rubber composition.

In the illustrated embodiment, forces $F_1$ and $F_2$ are substantially similar. In another embodiment (not shown), forces $F_1$ and $F_2$ are not substantially similar.

In the illustrated embodiment, the test drum 110 accelerates until it reaches a specified number of revolutions per minute. First selected tire 140 of first tire station 130 and second selected tire 240 of second tire station 230 engage the test drum 110 independently of each other.

Figure 3:
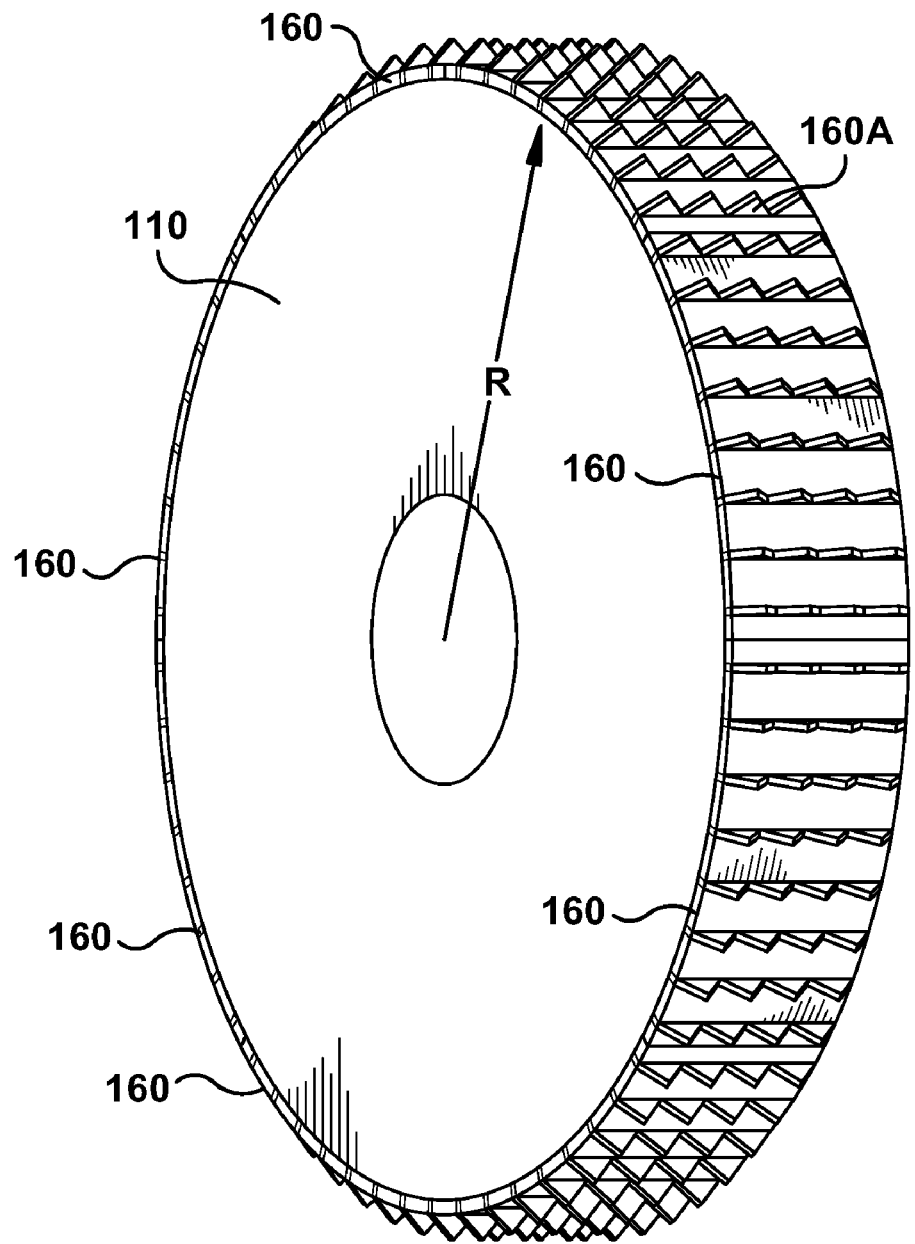
FIG. 3 illustrates a perspective view of a test drum having sectional plates.

In another embodiment (not shown), first selected tire 140 and second selected tire 240 are synchronized. For example, first selected tire 140 is tested while second selected tire 240 is loaded or unloaded, and second selected tire 240 is tested while first selected tire 140 is loaded or unloaded FIG. 3 illustrates a perspective view of a test drum 110 having a plurality of sectional plates 160. Test drum 110 has a radius R, and each sectional plate 160 has an inner radius R that is equal to the radius of the test drum. Sectional plates 160 removably attach to a radial surface (not shown) of test drum 110.

In the illustrated embodiment, the plurality of sectional plates 160 form a circumferential test surface 160A having a width that is greater than a lateral width (not shown) of the selected tire(s) 140, 240. Sectional plates 160 have the same width as the test drum 110. In another embodiment (not shown), sectional plates 160 are wider or narrower than the test drum 110.

In another embodiment (not shown), two or more plates extend side by side in the lateral direction. In yet another embodiment (not shown) the plurality of sectional plates 160 are replaced with a continuous ring that has a circumferentially continuous test surface 160A. In another embodiment (not shown), the plurality of sectional plates 160 are replaced with an open ring that covers less than 100% of the circumference of the test drum 110.

Figure 4:
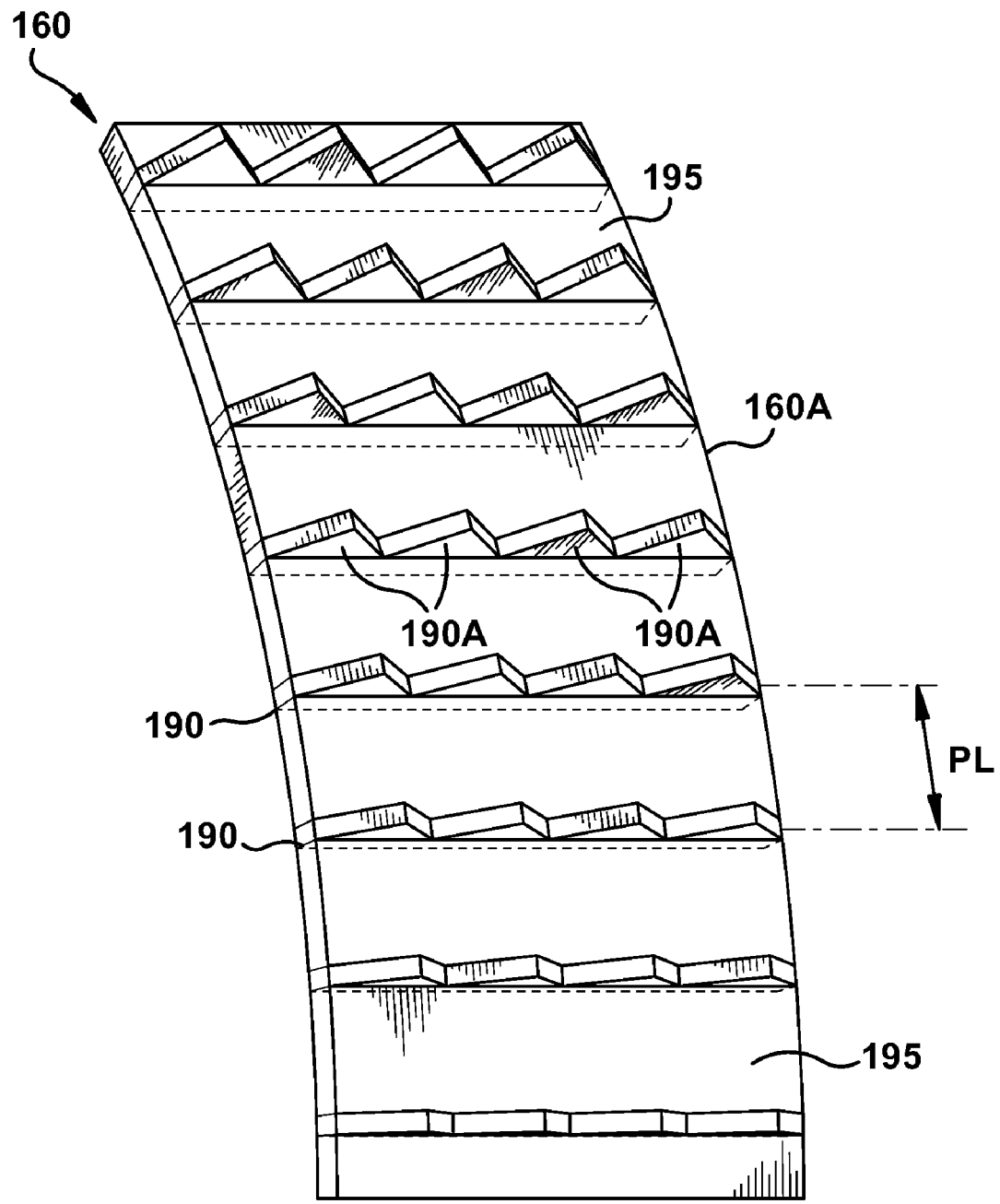
FIG. 4 illustrates a perspective view of a sectional plate.

FIG. 4 illustrates a perspective view of a sectional plate 160 forming a test surface 160A having a plurality of protrusions that extend therefrom. The protrusions may have varying heights, widths, and levels of sharpness.

Sectional plate 160 may be repeated around the circumference of test drum (not shown), or different types of plates may be employed on the same test drum. Test surface 160A provides a fore force, a lateral force, and a radial force. In other words, test surface 160A provides a force in a circumferential direction, a lateral direction, and a radial direction when test surface 160A makes contact with a rotating tire tread. In another embodiment (not shown), test surface 160A provides an aft force, a lateral force, and a radial force.

In the illustrated embodiment, ribs 190 include ridged portions 190A that have a triangular shape extending radially and laterally across sectional plate 160. In another embodiment (not shown), ridged portions 190A on the sectional plates 160 around the circumference of the test drum 110 have at least one of the following shapes: square, rectangular, circular, wavy, and the like. In yet another embodiment (not shown), ribs 190 have ridged portions 190A that are not identical (e.g., a first rib has portions that are triangular and a second rib has portions that are rectangular). In another embodiment (not shown), ridged portions 190A in an individual rib 190 include portions having at least one of the following shapes: square, rectangular, circular, wavy, and the like.

In another embodiment (not shown), ribs 190 are at a first angle of 45 degrees, relative to a plane A-A that is parallel to the axial direction. In yet another embodiment (not shown), ribs 190 are at an angle that can each range from −60 degrees to 60 degrees relative to plane A-A.

In the illustrated embodiment, a plurality of surfaces 195 separate circumferentially adjacent ribs 190 and define a pitch length PL from one rib to the next rib. In the illustrated embodiment, pitch lengths PL between ribs 190 are equal. In another embodiment (not shown), pitch lengths PL between ribs varies.

In the illustrated embodiment, pitch length PL accommodates a tread element of the selected tire 140, 240 to provide a chip and/or tear force to at least a portion of the tread element. For example, in one embodiment the pitch length PL has a circumferential length that is greater than a circumferential length of a lug on the selected tire 140, 240. In another embodiment, the pitch length PL has a circumferential length that is less than the circumferential length of a lug on the selected tire 140, 240, such that the pitch length only accommodates a portion of a tread component to provide a chip and/or tear force.

Figure 5:
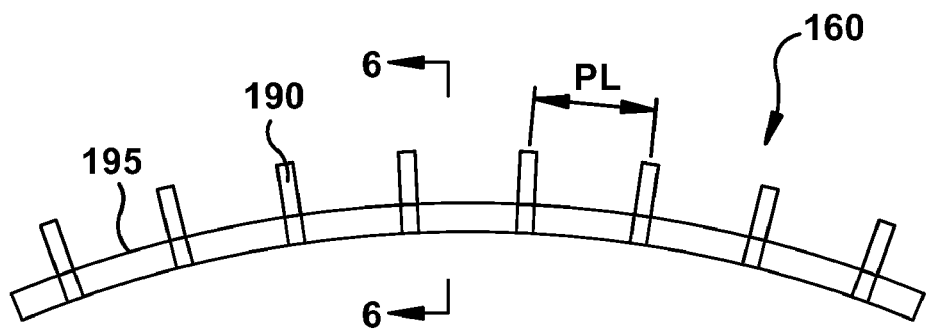
FIG. 5 illustrates a side view of the sectional plate illustrated in FIG. 4.

FIG. 5 illustrates a side view of sectional plate 160 illustrated in FIG. 4. Ribs 190 are circumferentially separated by pitch length PL and are radially disposed. In the illustrated embodiment, ribs 190 are parallel with the radius of sectional plate 160, i.e., at a 0 degree angle relative to the radius. In another embodiment, ribs 190 may be disposed at an acute angle with respect to the sectional plate. In yet another embodiment (not shown), ribs 190 are at an angle that ranges from 90 degrees to −90 degrees. In another embodiment (not shown), ribs 190 are at an angle that ranges from 45 degrees to −45 degrees. In yet another embodiment, the plurality of ribs 190 are at a plurality of angles that are different from one another, ranging from 90 degrees to −90 degrees.

Figure 6:
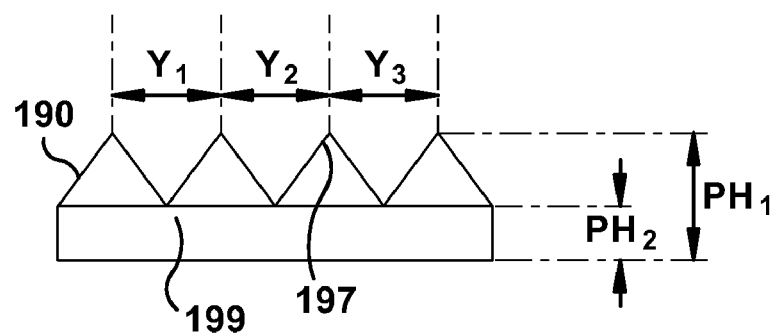
FIG. 6 illustrates a cross-section of the sectional plate illustrated in FIG. 4 taken along line 6-6.

FIG. 6 illustrates a cross-section of sectional plate 160 illustrated in FIG. 4 taken along line 6-6. Rib 190 includes alternating peaks and valleys, including peaks 197 at a first pitch height $PH_1$ and valleys 199 at a second pitch height $PH_2$ that is less than first pitch height $PH_1$. Although four peaks and three valleys are shown in FIG. 6, it should be understood that rib 190 may include any number of peaks and valleys.

Peaks 197 are laterally separated by equal distances $Y_1, Y_2$, and $Y_3$. Although the lateral distances between each rib peak and valley in the illustrated embodiment are equal, it should be understood that these distances can be unequal. Similarly, while the pitch heights $PH_1$ of each of the peaks 197 are shown as equal, it should be understood that these heights may vary. Likewise, while the pitch heights $PH_2$ of each of the valleys 199 are shown as equal, it should be understood that these heights may also vary.

Figure 7:
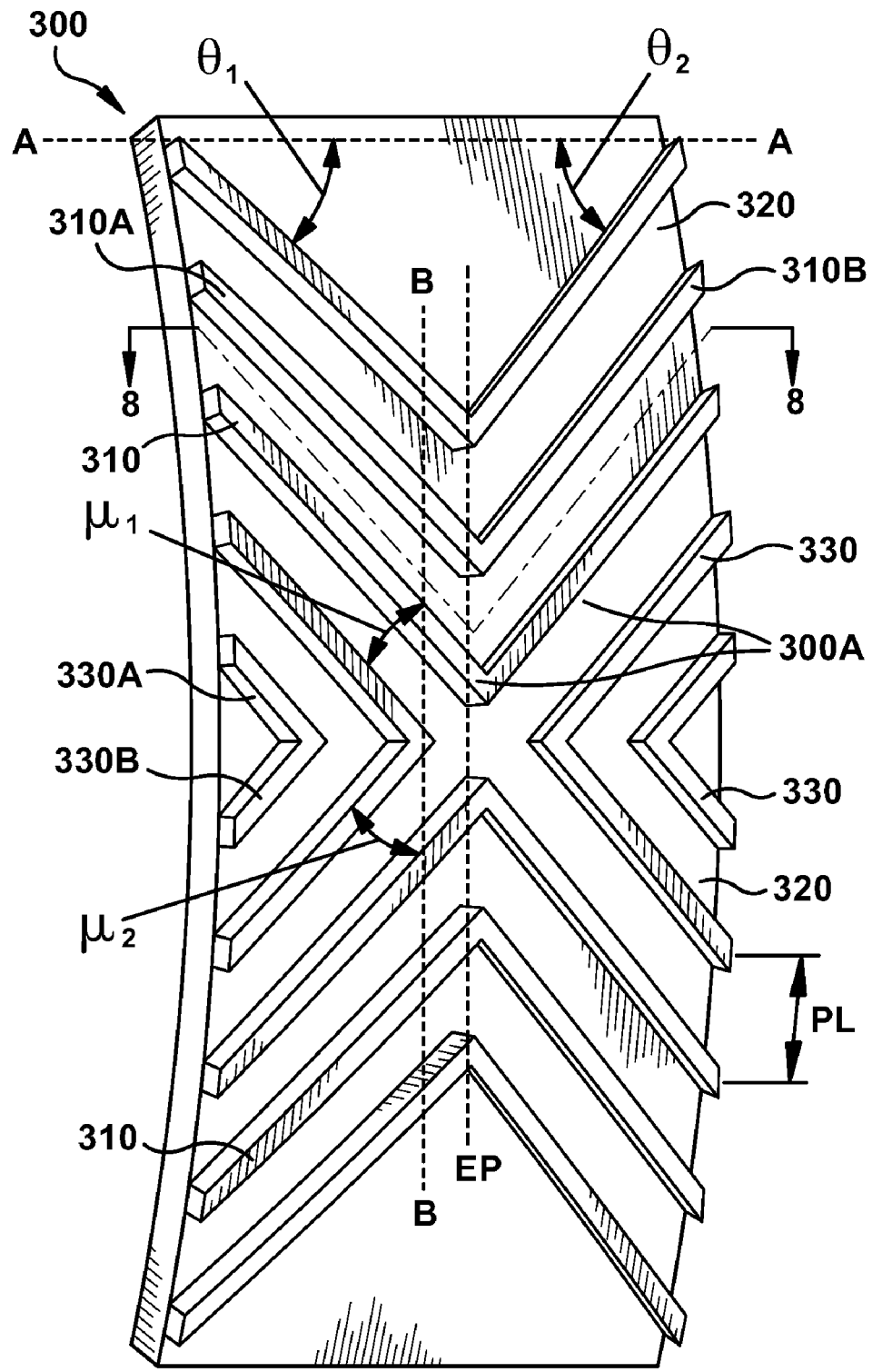
FIG. 7 illustrates a perspective view of a sectional plate from an alternative embodiment of a tire test drum.

FIG. 7 illustrates a perspective view of an alternative embodiment of sectional plate 300 having a test surface 300A that includes protrusions of varying heights, widths, and levels of sharpness. Test surface 300A includes a plurality of circumferential ribs 310 forming v-shapes that are circumferentially separated by surfaces 320 and a plurality of lateral ribs 330 forming v-shapes that are laterally separated by surfaces 320. In another embodiment (not shown), sectional plate 300 includes only circumferential ribs 310 forming v-shapes that are circumferentially separated by surfaces 320. In yet another embodiment (not shown), sectional plate 300 includes only lateral ribs 330 forming v-shapes that are laterally separated by surfaces 320. In another embodiment (not shown), ribs 310, 330 may be in the form of repeating w-shapes, zig-zag shapes, and other such shapes.

In the illustrated embodiment, circumferential ribs 310 on test surface 300A include first portion 310A disposed at a first angle $\theta_1$ of 45 degrees, relative to a plane A-A that is parallel to the axial direction, and a second portion 310B disposed at a second angle $\theta_2$ of −45 degrees relative to plane A-A. In another embodiment (not shown), angles $\theta_1$ and $\theta_2$ can range from −60 degrees to 60 degrees relative to plane A-A. In yet another embodiment (not shown), circumferential ribs 310 on test surface 300A include a plurality of portions disposed at more than two angles relative to lateral plane A-A. In another embodiment (not shown), circumferential ribs 310 on test surface 300B only include first portions 310A disposed at a first angle $\theta_1$.

Further, lateral ribs 330 on test surface 300A include first portion 330A disposed at a first angle $\mu_1$ of −45 degrees, relative to a plane B-B that is parallel to an equatorial plane EP, and a second portion 330B disposed at a second angle $\mu_2$ of 45 degrees relative to lateral plane B-B. In another embodiment (not shown), angles $\mu_1$ and $\mu_2$ can range from −60 degrees to 60 degrees relative plane B-B. In yet another embodiment (not shown), lateral ribs 330 on test surface 300A include a plurality of portions disposed at more than two angles relative to plane B-B. In another embodiment (not shown), lateral ribs 330 on test surface 300B only include first portions 330A disposed at a first angle $\mu_1$.

In the illustrated embodiment, ribs 310, 330 on test surface 300A on a rotating test drum (not shown) provide circumferential and laterals force against a tread surface of a selected tire (not shown).

In the illustrated embodiment, surfaces 320 between adjacent ribs 310 have equal pitch lengths PL. In another embodiment (not shown), surfaces 320 between adjacent ribs 310 have unequal pitch lengths PL.

Figure 8:
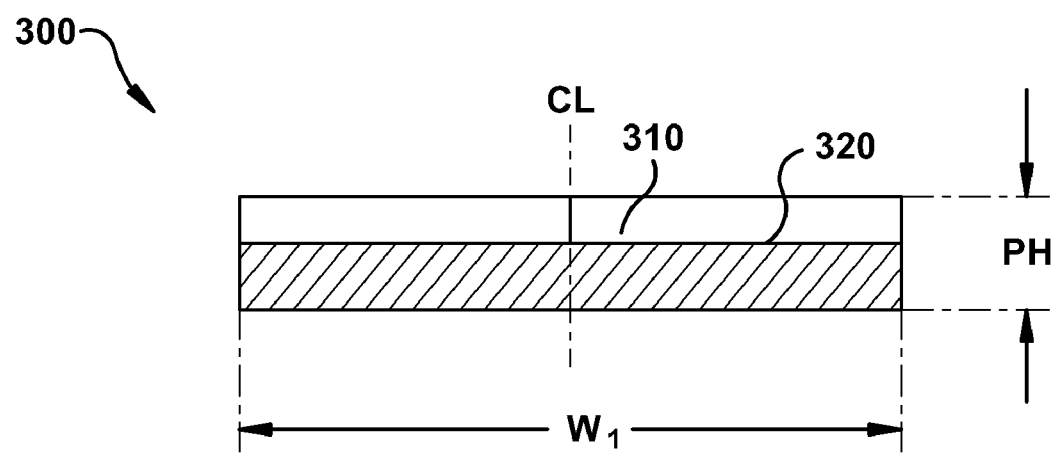
FIG. 8 illustrates a cross-section of the sectional plate illustrated in FIG. 7 taken along line 8-8.

FIG. 8 illustrates a cross-section of sectional plate 300 along line 8-8 illustrated in FIG. 7. Sectional plate 300 has lateral width $W_1$ that can range from 4 inches to 24 inches (10 to 61 centimeters). Ribs 310 have a pitch height PH that is constant across the section plate 300. In another embodiment, rib 310 has a pitch height PH that varies across the sectional plate 300. The pitch height can range from 10 to 75 millimeters. In another embodiment (not shown), surfaces 320 between adjacent ribs 310 have multiple test surfaces that have pitch heights less than the pitch height of ribs 310.

In another embodiment (not shown), sectional plate 300 includes ribs 310, 330 that have the same pitch height. In yet another embodiment (not shown), sectional plate 300 includes ribs 310, 330 that have different pitch heights.

Figure 9:
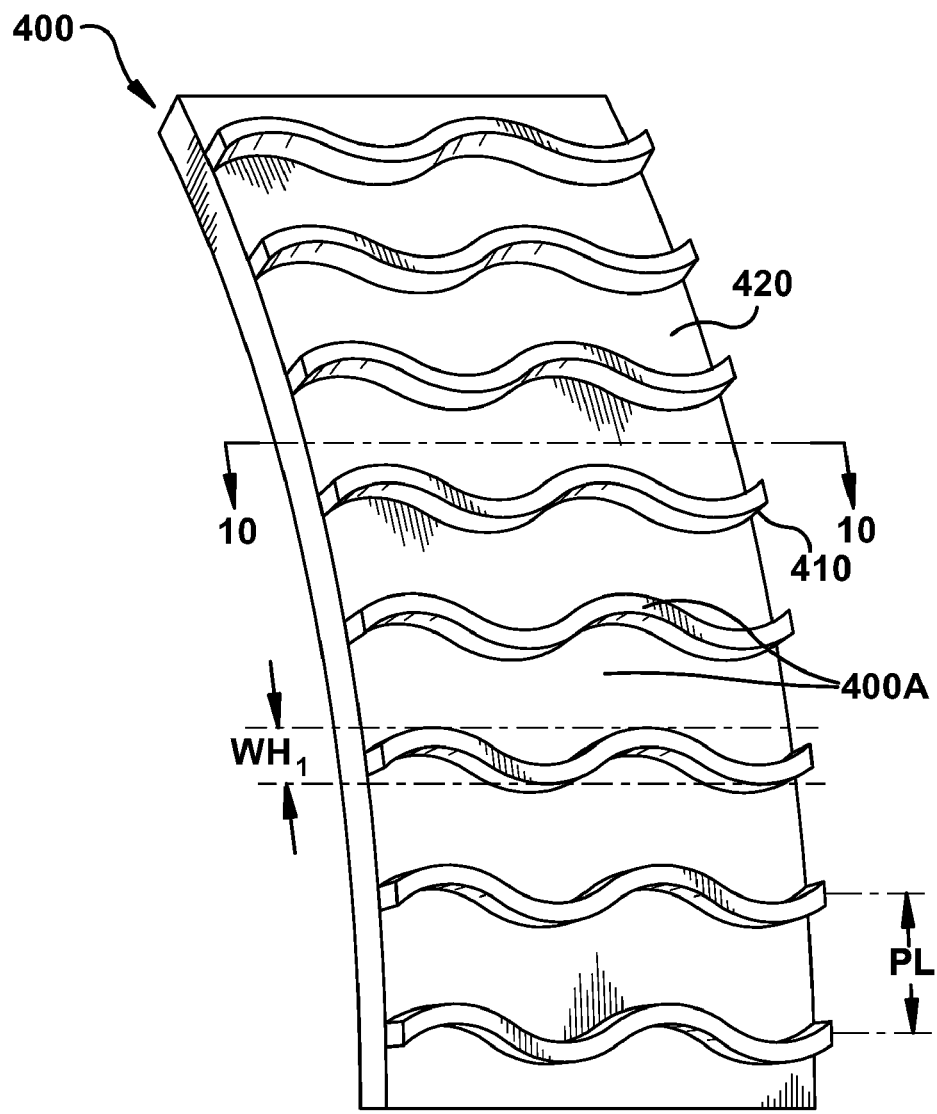
FIG. 9 illustrates a perspective view of a sectional plate from another alternative embodiment of a tire test drum.

FIG. 9 illustrates a perspective view of an alternative embodiment of sectional plate 400 having a test surface 400A that includes protrusions of varying heights, widths, and levels of sharpness. Test surface 400A provides a plurality of forces including a fore force or an aft force, a radial force, and a lateral force against a tread surface of a selected tire (not shown).

Test surface 400A includes a plurality of ribs 410 that are each in the form of a lateral wave having an amplitude or circumferential wave height $WH_1$. Each rib 410 is circumferentially separated from adjacent ribs by a surface 420. In the illustrated embodiment, each rib 410 includes two wavelengths of a sine wave, wherein each lateral end is a zero crossing. In an alternative embodiment (not shown), the rib may have more than two wavelengths. In another alternative embodiment (not shown), the rib may have less than two wavelengths. It should be understood that a rib does not need to include a whole number of wavelengths, but may also include a fraction of a wavelength. Similarly, the lateral ends of the rib may be a peak of a wave, a crest of a wave, or any other point of a wave.

In the illustrated embodiment, surfaces 420 between adjacent ribs 410 have equal pitch lengths PL. In another embodiment (not shown), flat surfaces 420 between adjacent ribs 410 form unequal pitch lengths PL.

Figure 10:
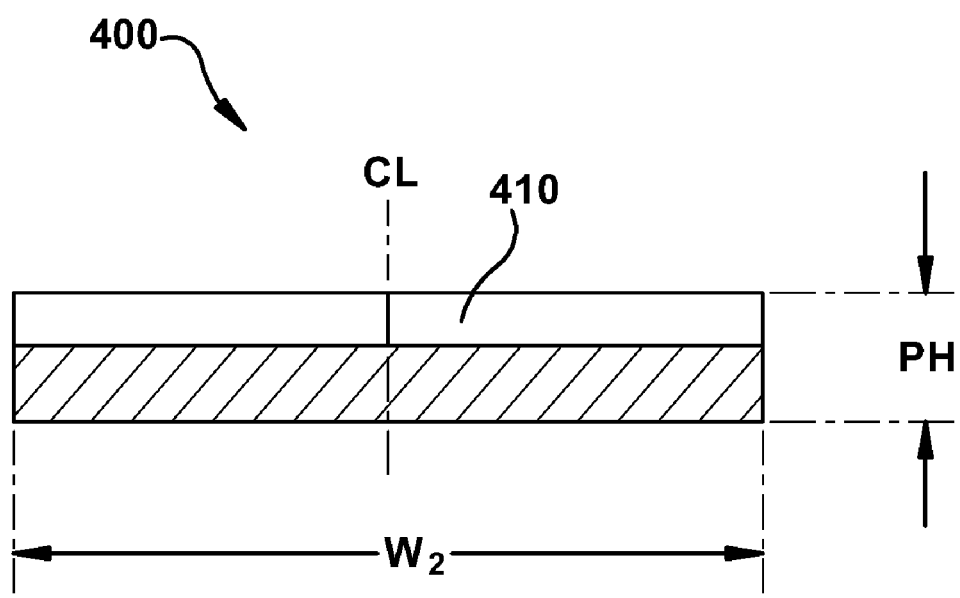
FIG. 10 illustrates a cross-section of the sectional plate illustrated in FIG. 9 taken along line 9-9.

FIG. 10 illustrates a cross-section of sectional plate 400 along line 10-10 illustrated in FIG. 9. Sectional plate 400 has lateral width $W_2$. Rib 410 has a radial height or pitch height PH that is constant laterally across section plate 400. In another embodiment, the pitch height PH of rib 410 varies in the lateral direction.

Figure 11:
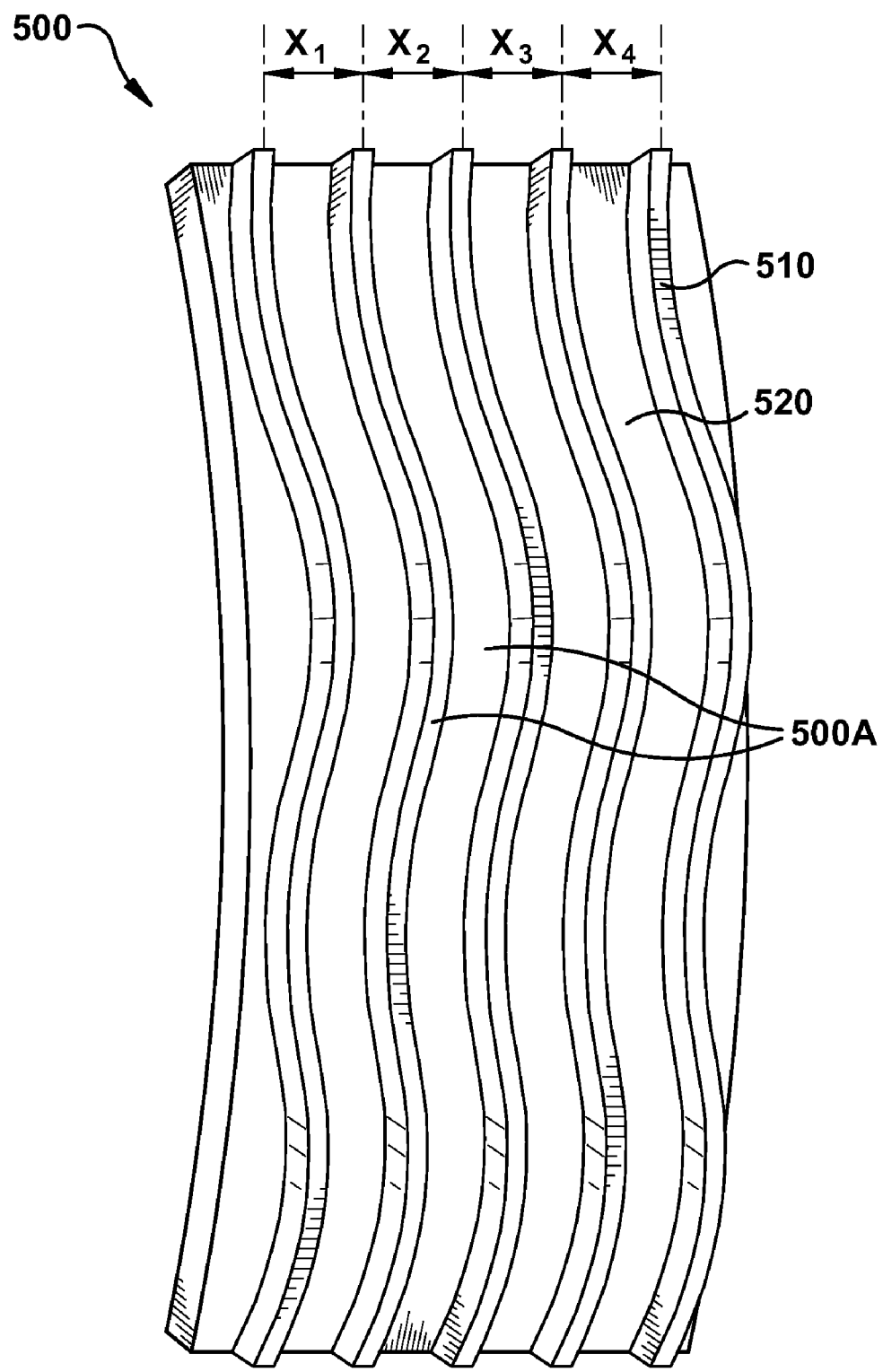
FIG. 11 illustrates a perspective view of a sectional plate from still another alternative embodiment of a tire test drum.

FIG. 11 illustrates a perspective view of an alternative embodiment of sectional plate 500 having a test surface 500A that includes protrusions of varying heights, widths, and levels of sharpness. Test surface 500A provides a plurality of forces including a fore force or an aft force, a radial force, and a lateral force against a tread surface of a selected tire (not shown).

In the illustrated embodiment, each rib 510 includes two wavelengths of a sine wave, wherein each circumferential end is a zero crossing. In an alternative embodiment (not shown), the rib may have more than two wavelengths. In another alternative embodiment (not shown), the rib may have less than two wavelengths. It should be understood that a rib does not need to include a whole number of wavelengths, but may also include a fraction of a wavelength. Similarly, the circumferential ends of the rib may be a peak of a wave, a crest of a wave, or any other point of a wave. In another embodiment (not shown), ribs 510 include a wave of a different shape than what is illustrated in FIG. 11.

In the illustrated embodiment, surfaces 520 between laterally adjacent ribs 510 have equal lateral distances X1, X2, X3, and X4. In another embodiment (not shown), surfaces 520 between laterally adjacent ribs 510 have unequal lateral distances.

Figure 12:
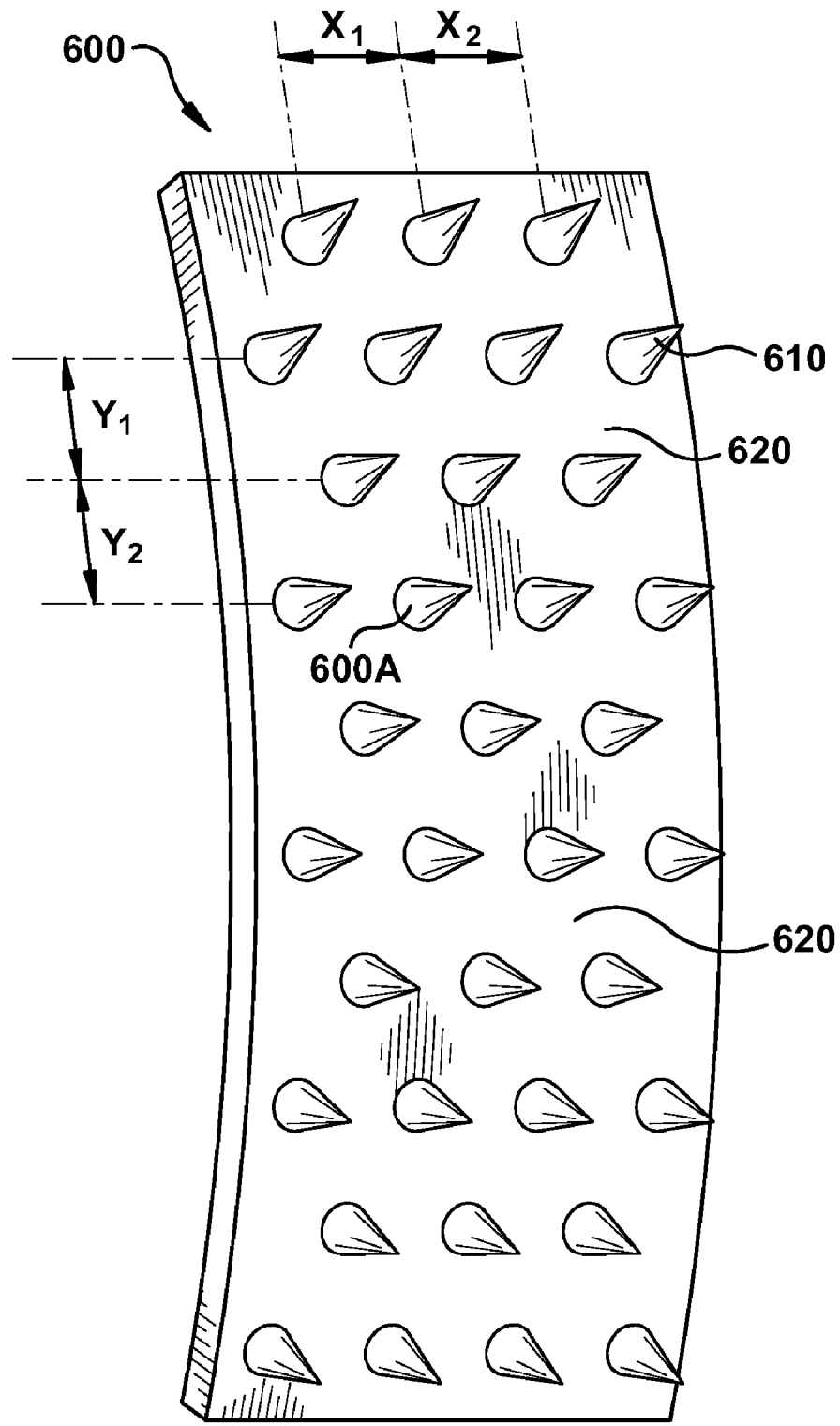
FIG. 12 illustrates a perspective view of a sectional plate from another alternative embodiment of a tire test drum.

FIG. 12 illustrates a perspective view of an alternative embodiment of sectional plate 600 having a test surface 600A that includes protrusions of varying heights, widths, and levels of sharpness. Test surface 600A provides a circumferential force and a lateral force when it contacts a rotating tire tread. In the illustrated embodiment, test surface 600A includes a plurality of spikes 610 of equal radial height. In another embodiment (not shown), test surface 600A may include posts, pegs, blocks, bumps, and other types of projections. In yet another embodiment (not shown), test surface 600A includes projections that include multiple diameters. For example, projections that include a first end having a first diameter and a second end having a second diameter, wherein the first diameter is greater than the second diameter. In another embodiment (not shown), test surface 600A includes projections having unequal radial heights. The number of illustrated spikes is exemplary, and any number of spikes may be employed as desired.

In the illustrated embodiment, spikes 610 are separated by surfaces 620. Spikes 610 are circumferentially separated by equal circumferential distances $Y_1$ and $Y_2$ and laterally separated by equal lateral distances $X_1$ and $X_2$. In another embodiment (not shown), spikes 610 are separated by at variable lateral distances.

In the illustrated embodiment, spikes 610 in alternating lateral rows are circumferentially offset with spikes 610 in circumferentially adjacent rows. In another embodiment (not shown), spikes 610 in each lateral row are circumferentially aligned with spikes 610 in at least one circumferentially adjacent row. In yet another embodiment (not shown), spikes 610 are arranged randomly or in any desired pattern. In another embodiment (not shown), ribs of different shapes may be included as desired.

Figure 13:
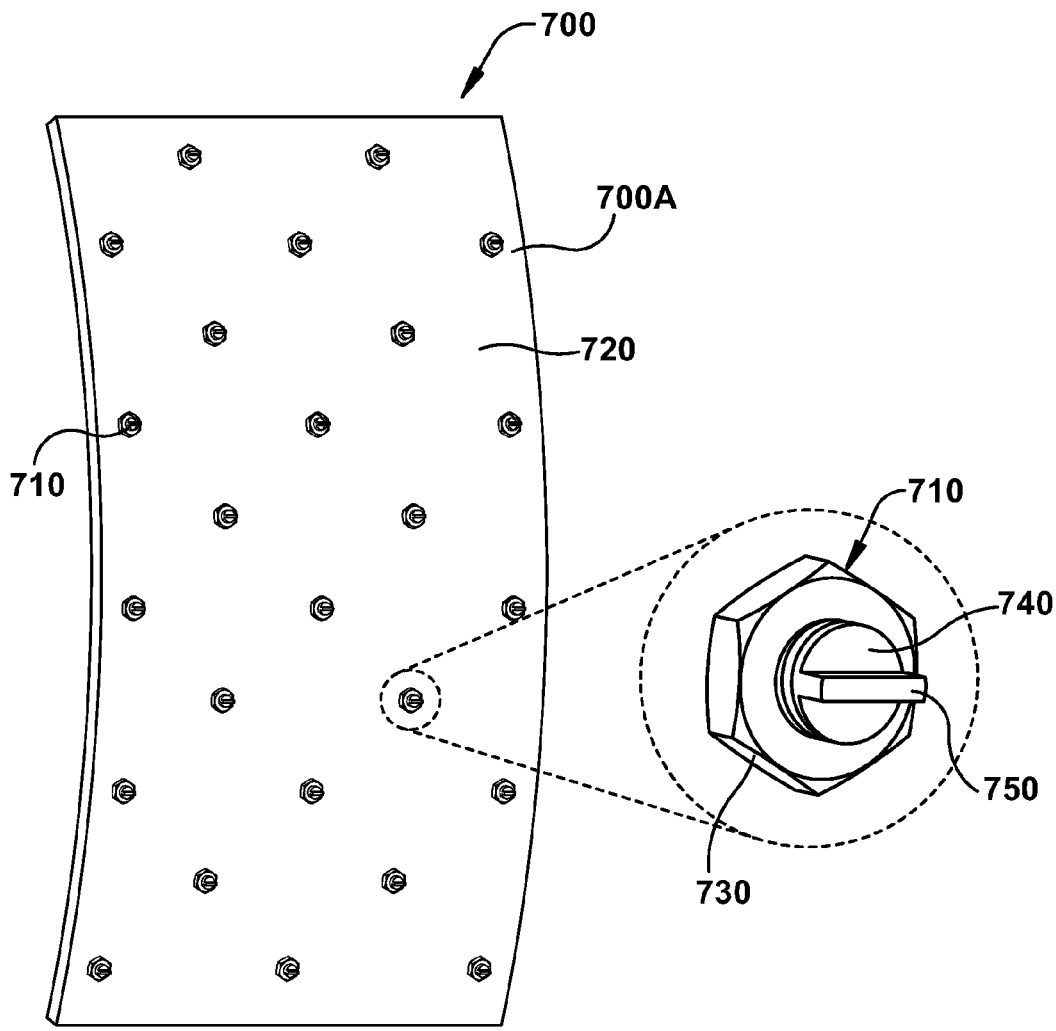
FIG. 13 illustrates a perspective view of a sectional plate from yet another alternative embodiment of a tire test drum.

FIG. 13 illustrates a perspective view of an alternative embodiment of sectional plate 700 having a test surface 700A that includes protrusions of varying heights, widths, and levels of sharpness. Test surface 700A provides a circumferential force (e.g., a fore force or an aft force, a radial force, and a lateral force) of different magnitudes when it contacts a rotating tire tread. In another embodiment (not shown), test surface 700A provides a circumferential force and a lateral force when the sectional plate 700 contacts a rotating tire tread.

In the illustrated embodiment, test surface 700A includes a plurality of straight-edge spikes 710 that are separated by surfaces 720. Each straight-edge spike 710 includes a base 730 and a shaft 740 that includes a radially extending straight edge 750.

In the illustrated embodiment, base 730 is removable attached to sectional plate 700. In another embodiment (not shown), base 730 is not removable attached to sectional plate 700.

In the illustrated embodiment, radially extending straight edges 750 extend laterally across shaft 740. In another embodiment (not shown), radially extending straight edges 750 extend circumferentially across shaft 740. In yet another embodiment (not shown), radially extending straight edges 750 extend across shaft 740 at an angle (not shown) relative to the lateral direction.

Figure 14:
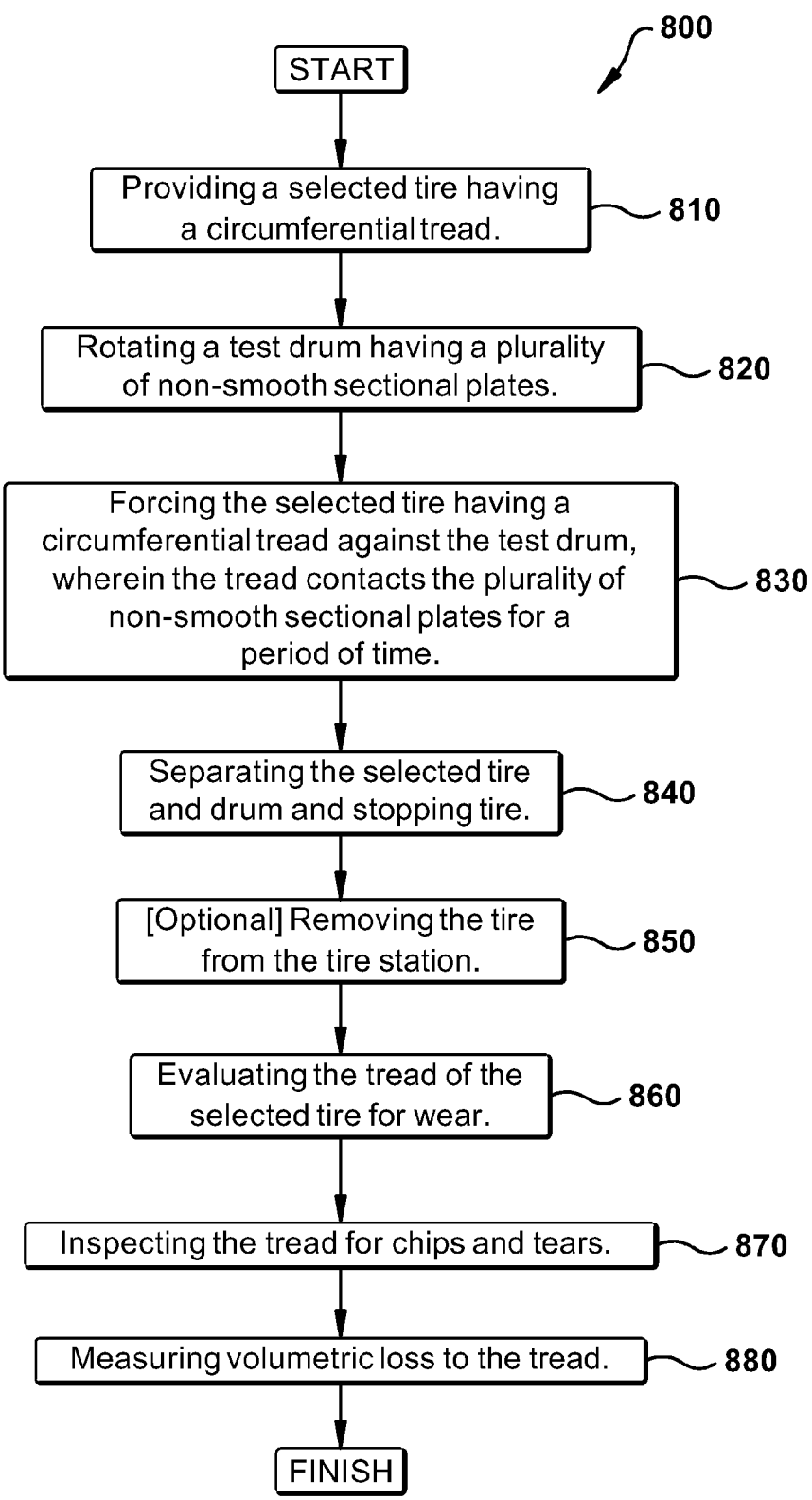
FIG. 14 illustrates a flow chart of a method to use a tire chip and tear test apparatus.

FIG. 14 illustrates a flow chart of a method for using a tire chip and tear test apparatus 800. As shown in FIG. 14, a user provides a selected tire having a circumferential tread at 810. The user rotates a test drum having a plurality of test surface sectional plates at 820 and provides a force to bring the selected tire having the circumferential tread into contact with the test surface sectional plates on the test drum, and maintain that contact for a period of time at 830. Test drum and the selected tire are driven using at least one motor, wherein the at least one motor can include electric and hydraulic designs. At 840, the user separates the selected tire and drum and stops the tire. At optional 850, the selected tire is removed from the tire station. At 860, the user evaluates the tread of the selected tire wear including inspecting the tire for chips and tears at 870. At 880, the user measures volumetric loss of the tread of the selected tire. For example, laser topography measurement and other objective measurements are used to measure wear. In another embodiment (not shown), the method includes multiple test stations so there is at least one selected tire that is forced against the test drum and then inspected for chips and tears.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A tire testing system comprising:
    a test drum;
    a motor configured to drive the test drum;
    a tire station configured to hold a selected tire and to apply a force; and
    a plurality of sectional plates removably attached to a radial surface of the test drum, wherein the plurality of sectional plates form a test surface having a plurality of protrusions configured to tear or chip the selected tire.

2. The system of claim 1, wherein the force is at least one of a radial force, a circumferential force, and a lateral force.

3. The system of claim 1, wherein the plurality of protrusions include a plurality of ribs.

4. The system of claim 3, wherein the ribs include a plurality of peaks having a first pitch height and a plurality of valleys having a second pitch height less than the first pitch height.

5. The system of claim 3, wherein each of the plurality of ribs includes at least a first portion disposed at a first angle relative to a plane parallel to an axial direction of the test drum and a second portion disposed at a second angle relative to the plane parallel to the axial direction of the test drum, wherein the first angle is different from the second angle.

6. The system of claim 3, wherein each of the plurality of ribs includes at least a first portion disposed at a first angle relative to a plane parallel to an equatorial plane of the test drum and a second portion disposed at a second angle relative to the plane parallel to the equatorial plane of the test drum, wherein the first angle is different from the second angle.

7. The system of claim 3, wherein each of the plurality of ribs is wave-shaped.

8. The system of claim 3, wherein the ribs extend in a radial direction.

9. The system of claim 1, wherein the plurality of protrusions include a plurality of spikes.

10. A tire testing apparatus comprising:
    a test drum having a test surface with a plurality of protrusions extending therefrom, wherein the protrusions are configured to tear or chip the selected tire; and
    at least one tire station configured to hold a selected tire against the test surface, such that the test surface applies a force against a tread of the selected tire.

11. The apparatus of claim 10, wherein the at least one test station includes a first tire station and a second tire station, each configured to hold a selected tire.

12. The apparatus of claim 10, wherein the plurality of protrusions include curved lateral ribs.

13. The apparatus of claim 10, wherein the plurality of protrusions include lateral ribs having at least one radially outer surface that varies in height along a lateral surface.

14. The apparatus of claim 10, wherein the plurality of protrusions include a plurality of ribs having a first portion disposed at a first angle relative to a plane parallel with an axial direction of the sectional plates and a second portion disposed at a second angle relative to the plane parallel with the axial direction of the sectional plates, wherein the second angle is different from the first angle.

15. The apparatus of claim 14, wherein the first angle and second angle range from negative 60 to positive 60 degrees.

16. The apparatus of claim 10, wherein the plurality of protrusions include a plurality of spikes.

17. The apparatus of claim 10, wherein the plurality of spikes are straight-edge spikes.

18. A tire testing method comprising:
    providing a selected tire having a circumferential tread;
    rotating a test drum having a test surface with protrusions extending therefrom;
    moving the selected tire against the test drum such that the circumferential tread contacts the test surface;
    maintaining contact between the circumferential tread of the selected tire and the test surface for a selected period of time, such that the protrusions tear or chip the selected tire;
    moving the selected tire away from the test drum; and
    evaluating the tread for wear.

19. The method of claim 18, further comprising inspecting the tread for chips and tears.

20. The method of claim 19, further comprising measuring volumetric loss of the tread.

* * * * *